(12) United States Patent
Iijima et al.

(10) Patent No.: US 8,845,797 B2
(45) Date of Patent: Sep. 30, 2014

(54) CARBON DIOXIDE RECOVERY SYSTEM

(75) Inventors: Masaki Iijima, Tokyo (JP); Koji Kadono, Amagasaki (JP); Kazuhiko Kaibara, Amagasaki (JP)

(73) Assignees: Mitsubishi Heavy Industries, Ltd., Tokyo (JP); The Kansai Electric Power Co., Inc., Osaka-shi (JP)

(*) Notice: Subject to any disclaimer, the term of this patent is extended or adjusted under 35 U.S.C. 154(b) by 354 days.

(21) Appl. No.: 13/357,929

(22) Filed: Jan. 25, 2012

(65) Prior Publication Data

US 2012/0269690 A1    Oct. 25, 2012

(30) Foreign Application Priority Data

Apr. 21, 2011    (JP) ................... 2011-095387

(51) Int. Cl.
*B01D 53/14*    (2006.01)

(52) U.S. Cl.
CPC ........ *B01D 53/1475* (2013.01); *B01D 53/1418* (2013.01); *Y02C 10/06* (2013.01); *B01D 2258/0283* (2013.01); *B01D 53/1425* (2013.01); *B01D 2252/204* (2013.01); *B01D 2259/816* (2013.01)
USPC .................... 96/234; 95/156; 95/185; 95/236

(58) Field of Classification Search
None
See application file for complete search history.

(56) References Cited

U.S. PATENT DOCUMENTS

| | | | | | |
|---|---|---|---|---|---|
| 4,002,721 | A | * | 1/1977 | Guffy et al. | 423/232 |
| 5,648,048 | A | * | 7/1997 | Kuroda et al. | 422/168 |
| 5,730,784 | A | * | 3/1998 | Smith et al. | 95/181 |
| 6,146,603 | A | | 11/2000 | Chakravarti et al. | |
| 6,759,018 | B1 | * | 7/2004 | Arno et al. | 423/210 |
| 7,829,049 | B2 | | 11/2010 | Find et al. | |
| 2007/0148069 | A1 | * | 6/2007 | Chakravarti et al. | 423/220 |
| 2010/0307344 | A1 | * | 12/2010 | Iijima et al. | 96/234 |
| 2011/0126710 | A1 | * | 6/2011 | McDermott et al. | 95/224 |
| 2011/0247336 | A9 | * | 10/2011 | Farsad et al. | 60/685 |

FOREIGN PATENT DOCUMENTS

| | | | |
|---|---|---|---|
| EP | 1 061 045 | A1 | 12/2000 |
| EP | 1 953 130 | A1 | 8/2008 |
| EP | 2 258 461 | A1 | 12/2010 |
| JP | 3663117 | B2 | 6/2005 |

(Continued)

OTHER PUBLICATIONS

Notice of Allowance dated Aug. 27, 2013, in connection with the corresponding Canadian Application No. 2765120. (1 page).

(Continued)

*Primary Examiner* — Duane Smith
*Assistant Examiner* — Pankti Patel
(74) *Attorney, Agent, or Firm* — Westerman, Hattori, Daniels & Adrian, LLP (57) ABSTRACT

A $CO_2$ recovery system includes a $CO_2$ absorption tower for absorbing $CO_2$ in combustion exhaust gas into an absorbing solution by bringing the combustion exhaust gas into contact with the absorbing solution that absorbs $CO_2$; a dissolved oxygen removing device that uses at least one device of a device for blowing bubbling gas into the rich absorbing solution into which $CO_2$ has been absorbed, a device for applying ultrasonic oscillation, and a device for heating the rich absorbing solution; a bubble removing device that turns the rich absorbing solution into which $CO_2$ has been absorbed in the $CO_2$ absorption tower into a swirling flow or agitates the rich absorbing solution; and a regeneration tower that regenerates the absorbing solution by releasing $CO_2$ from the absorbing solution from which oxygen has been removed by the dissolved oxygen removing device and the bubble removing device and obtains $CO_2$ gas.

6 Claims, 4 Drawing Sheets

(56) References Cited

FOREIGN PATENT DOCUMENTS

| JP | 3754275 B2 | 3/2006 |
| JP | 2007-137725 A | 6/2007 |
| JP | 2010-253370 A | 11/2010 |
| WO | 2007/009461 A2 | 1/2007 |

OTHER PUBLICATIONS

European Search Report dated Jul. 24, 2012, issued in corresponding European Patent Application No. 12152677.6.(7 pages).

* cited by examiner

CARBON DIOXIDE RECOVERY SYSTEM

BACKGROUND OF THE INVENTION

The present invention relates to a carbon dioxide recovery system, and more particularly, relates to a carbon dioxide recovery system capable of sufficiently reducing the oxygen concentration in carbon dioxide gas recovered from combustion exhaust gas.

To prevent carbon dioxide, which has been named as a global-warming gas, from being released into the atmosphere, in thermal power plants and the like in which fossil fuels are used, there has been carried out a method in which exhaust gas generated by the combustion of the fossil fuel is brought into contact with an absorbing solution to remove carbon dioxide from the combustion exhaust gas, the absorbing solution having absorbed carbon dioxide is heated to release carbon dioxide from the absorbing solution, and the absorbing solution is regenerated. Also, it has been proposed that the recovered carbon dioxide gas be used as a raw material in the chemical industry, or be used as a gas for pressure in an oil field for the enhanced oil recovery (EOR) process.

Unfortunately, since in the combustion exhaust gas from which carbon dioxide ($CO_2$) is recovered, oxygen ($O_2$), which is a combustion residue, always exists in the carbon dioxide gas recovered as described above, and the oxygen usually exists in a concentration of 40 to 200 ppm in the carbon dioxide. This oxygen dissolves in the absorbing solution, or exists as bubbles. In the case which this carbon dioxide gas is used as a raw material in the chemical industry, there arises a problem in that this oxygen poisons the catalyst. Also, in the case in which this carbon dioxide gas is used as an oil field filling gas, there arise a problem in that the carbon dioxide gas causes oxidation or corrosion of equipment, and a problem in that the carbon dioxide gas reacts with hydrogen sulfide in the oil field to precipitate sulfur (solid), among other problems. To prevent these problems from arising, it has been demanded to reduce the oxygen concentration in the carbon dioxide gas to be recovered.

Japanese Patent No. 3663117 describes that by dropping the absorbing solution having absorbed carbon dioxide (hereinafter, referred to as a "rich absorbing solution") into a vessel filled with a filler, the oxygen in the rich absorbing solution can be removed. Also, Japanese Patent No. 3754275 describes an improved method in which when the rich absorbing solution is dropped into the vessel filled with a filler, a stripping gas is caused to flow.

U.S. Pat. No. 7,829,049 describes that if the rich absorbing solution having absorbed carbon dioxide is heated to 70 to 140° C. and is flushed, nitrogen oxide in the rich absorbing solution is removed, and the nitrogen oxide in the recovered carbon dioxide gas can be reduced to almost zero. It has also been proposed that by this processing, the oxygen in the carbon dioxide gas can also be removed together with nitrogen oxide.

SUMMARY OF THE INVENTION

Unfortunately, the methods described in Japanese Patent No. 3663117 and Japanese Patent No. 3754275 have a problem in that although the oxygen in the rich absorbing solution can reliably be removed, oxygen having such a concentration as to present a problem in the above-described applications remains. Also, the method described in U.S. Pat. No. 7,829,049 has a problem in that carbon dioxide is undesirably released together with nitrogen oxide because the rich absorbing solution is heated and flushed, so that the recovery rate of carbon dioxide decreases.

The present invention has been made to solve the above problems, and accordingly an object thereof is to provide a carbon dioxide recovery system capable of sufficiently reducing the oxygen concentration in the recovered carbon dioxide gas while the rate of recovery at which carbon dioxide is recovered from an absorbing solution is maintained high.

To achieve the above object, the present invention provides a carbon dioxide recovery system including a carbon dioxide absorbing device for absorbing carbon dioxide in combustion exhaust gas into an absorbing solution by bringing the combustion exhaust gas into contact with the absorbing solution that absorbs carbon dioxide; a dissolved oxygen removing device for removing dissolved oxygen in a rich absorbing solution into which carbon dioxide has been absorbed by the carbon dioxide absorbing device; a bubble removing device for removing bubbles containing oxygen in the rich absorbing solution into which carbon dioxide has been absorbed by the carbon dioxide absorbing device; and a regenerating device that regenerates the absorbing solution by releasing carbon dioxide from the absorbing solution from which oxygen has been removed by the dissolved oxygen removing device and the bubble removing device and obtains carbon dioxide gas.

In the flow of the rich absorbing solution, the bubble removing device may be provided on the rear flow side of the dissolved oxygen removing device. For example, the configuration can be made such that the dissolved oxygen removing device is provided in the carbon dioxide absorbing device, on the rear flow side thereof, a vessel is provided separately, and the bubble removing device is provided in this vessel.

Also, in the flow of the rich absorbing solution, the dissolved oxygen removing device may be provided on the rear flow side of the bubble removing device. For example, the configuration can be made such that first and second vessels for storing the rich absorbing solution are provided in that order on the rear flow side of the carbon dioxide absorbing device, the bubble removing device is provided in the first vessel, and the dissolved oxygen removing device is provided in the second vessel.

Furthermore, the bubble removing device and the dissolved oxygen removing device can be provided so as to process the rich absorbing solution at the same time. For example, the configuration can be made such that a vessel for storing the rich absorbing solution is provided on the rear flow side of the carbon dioxide absorbing device, and the bubble removing device and the dissolved oxygen removing device are provided in this vessel.

As the dissolved oxygen removing device, at least one device of a device for blowing bubbling gas into the rich absorbing solution, a device for applying ultrasonic oscillation, and a device for heating the rich absorbing solution is preferably used. As the bubble removing device, at least one device of a device for blowing bubbling gas into the rich absorbing solution or applying ultrasonic oscillation or a device for turning the rich absorbing solution into a swirling flow or agitating the rich absorbing solution is preferably used. Both the device for blowing bubbling gas into the rich absorbing solution and the device for applying ultrasonic oscillation to the rich absorbing solution are devices for removing dissolved oxygen and oxygen bubbles. Therefore, the configuration can be made such that the dissolved oxygen removing device and the bubble removing device are made an identical device, and as this identical device, a device for blowing bubbling gas into the rich absorbing solution or applying ultrasonic oscillation is used.

As described above, according to the present invention, the oxygen existing in the rich absorbing solution comes in two types: oxygen dissolving in the absorbing solution and oxygen existing as bubbles. The dissolved oxygen can be removed by blowing bubbling gas, by applying ultrasonic oscillation, or by heating the rich absorbing solution. On the other hand, the oxygen bubbles can be removed by turning the rich absorbing solution into a swirling flow or by agitating the rich absorbing solution. Therefore, the oxygen in the rich absorbing solution can be removed to a high degree, and thereby the oxygen concentration in the recovered carbon dioxide gas can be reduced sufficiently while the rate of recovery at which carbon dioxide is recovered from the absorbing solution is maintained high.

DETAILED DESCRIPTION OF THE PREFERRED EMBODIMENT

Figure 1:
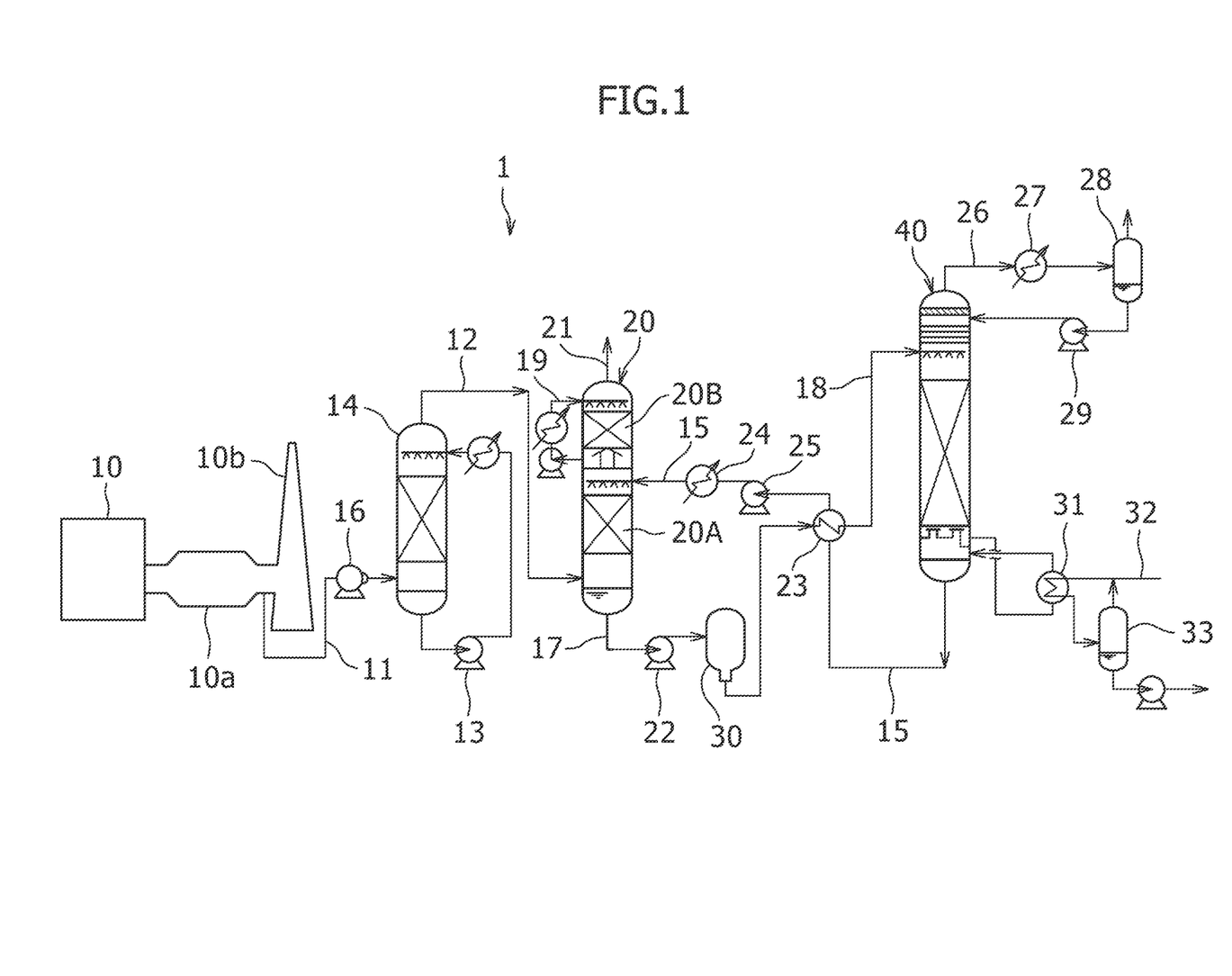
FIG. 1 is a schematic view showing one embodiment of a carbon dioxide recovery system in accordance with the present invention.

An embodiment of a carbon dioxide recovery system in accordance with the present invention will now be described with reference to the accompanying drawings. As shown in FIG. 1, a carbon dioxide recovery system 1 of this embodiment mainly includes an exhaust gas cooling tower 14 for cooling combustion exhaust gas exhausted from a boiler 10, a carbon dioxide absorption tower 20 in which the cooled combustion exhaust gas is brought into contact with an absorbing solution to remove carbon dioxide from the exhaust gas, a swirling flow separator 30 in which the absorbing solution having absorbed carbon dioxide (hereinafter, referred to as a "rich absorbing solution") is turned into a swirling flow to separate bubbles from the rich absorbing solution, and a regeneration tower 40 in which carbon dioxide is released from the rich absorbing solution, from which bubbles have been removed, to regenerate the absorbing solution. The absorbing solution that has been regenerated by removing carbon dioxide from the rich absorbing solution is hereinafter referred to as a "lean absorbing solution").

The boiler 10 includes a flue-gas duct 10a for combustion exhaust gas, and a stack 10b for releasing combustion exhaust gas into the atmosphere. Between the flue-gas duct 10a and the tower lower portion of the exhaust gas cooling tower 14, an exhaust gas introduction line 11 in which exhaust gas flows and an exhaust gas blower 16 for sending exhaust gas are provided.

The exhaust gas cooling tower 14 is provided with a cooling water circulation line 13 in which cooling water flows from the tower bottom portion of the exhaust gas cooling tower 14 to the tower upper portion thereof. Between the tower top portion of the exhaust gas cooling tower 14 and the tower lower portion of the carbon dioxide absorption tower 20, an exhaust gas line 12 in which the cooled exhaust gas flows is provided.

The carbon dioxide absorption tower 20 includes a carbon dioxide recovery part 20A located in a tower middle portion, and a washing part 20B located in a tower upper portion.

Between a portion between the carbon dioxide recovery part 20A and the washing part 20B of the carbon dioxide absorption tower 20 and the tower bottom portion of the regeneration tower 40, a lean absorbing solution line 15 in which the lean absorbing solution flows is provided. Between the tower bottom portion of the carbon dioxide absorption tower 20 and the swirling flow separator 30, a rich absorbing solution line 17 in which the rich absorbing solution flows is provided. Also, between the bottom portion of the swirling flow separator 30 and the tower upper portion of the regeneration tower 40 as well, a rich absorbing solution line 18 in which the rich absorbing solution flows is provided.

In the lean absorbing solution line 15 and the rich absorbing solution line 18, a rich and lean solvent heat exchanger 23 for carrying out heat exchange therebetween is provided. In the lean absorbing solution line 15, a lean solvent cooler 24 for further cooling the lean absorbing solution and a lean solvent pump 25 for pressurizedly sending the lean absorbing solution are provided between the carbon dioxide absorption tower 20 and the heat exchanger 23. Also, the carbon dioxide absorption tower 20 includes a condensed water circulation line 19 that takes in the gas from a portion below the washing part 20B, produces condensed water, and sends the condensed water to a portion above the washing part 20B, and an exhaust gas release line 21 that releases exhaust gas from the tower top portion of the carbon dioxide absorption tower 20.

Figure 2:
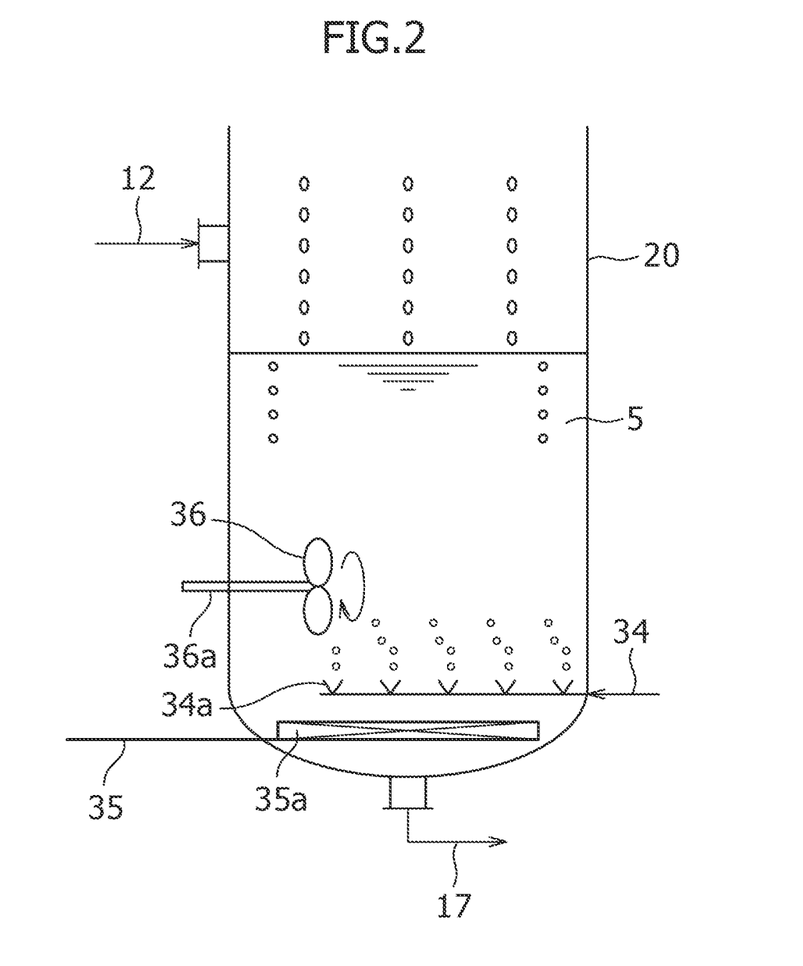
FIG. 2 is a cross-sectional view schematically showing the tower bottom portion of a carbon dioxide absorption tower shown in FIG. 1.

As shown in FIG. 2, in the tower bottom portion of the carbon dioxide absorption tower 20, a rich absorbing solution 5 stays. The carbon dioxide absorption tower 20 is provided with a bubbling gas supplier 34 and an ultrasonic wave generator 35 in the tower bottom portion thereof. In this embodiment, the case in which both of these two elements are provided is explained. However, the present invention is not limited to this configuration, and at least one of these two elements may be provided. The bubbling gas supplier 34 is provided with a plurality of nozzles 34a for blowing bubbling gas into the rich absorbing solution 5. The ultrasonic wave generator 35 is provided with an oscillator 35a that oscillates to apply ultrasonic oscillation to the rich absorbing solution 5. Also, the carbon dioxide absorption tower 20 is provided with an agitator 36 in the tower bottom portion thereof. The agitator 36 is configured so that the rotating shaft 36a thereof extends in the horizontal direction.

As the swirling flow separator 30, a press-in type swirling flow separator in which the rich absorbing solution is pressed in to form a swirling flow or a vane type swirling flow separator in which a vane is rotated to form a swirling flow can be employed.

Figure 3:
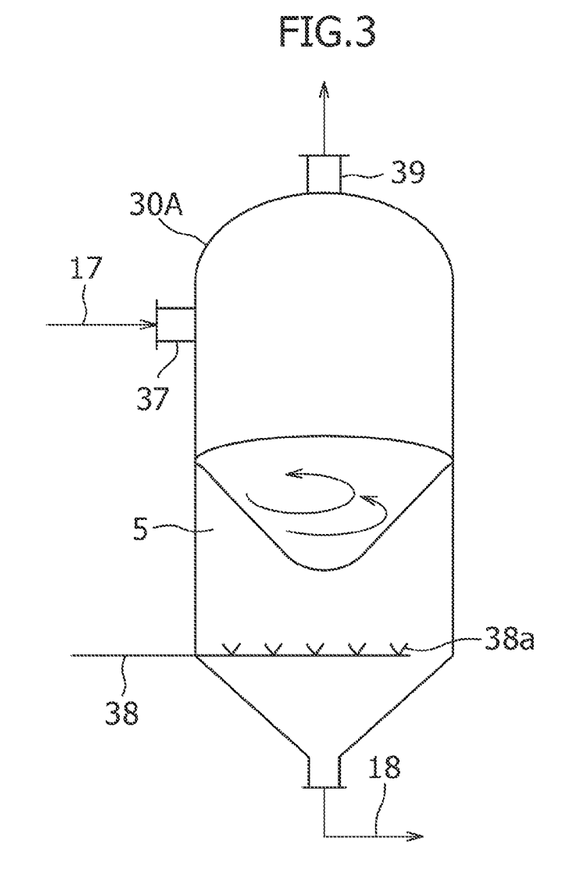
FIG. 3 is a side view schematically showing one example of a swirling flow separator shown in FIG. 1.
Figure 4:
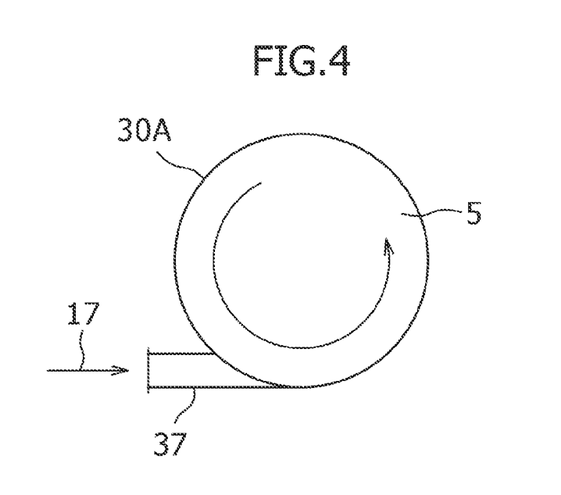
FIG. 4 is a plan view schematically showing the swirling flow separator shown in FIG. 3.

As shown in FIGS. 3 and 4, a press-in type swirling flow separator 30A is provided with a supply port 37 for the rich absorbing solution so that the rich absorbing solution flows in the tangential direction of the cross-sectional circle of the swirling flow separator 30A. Also, this swirling flow separator 30A is provided with a bubbling gas supplier 38 in the lower portion thereof, and the bubbling gas supplier 38 is provided with a plurality of nozzles 38a for blowing bubbling gas into the rich absorbing solution 5. The swirling flow separator 30A is provided with an oxygen discharge line 39, which discharges oxygen released from the rich absorbing solution, in the top portion thereof.

Figure 5:
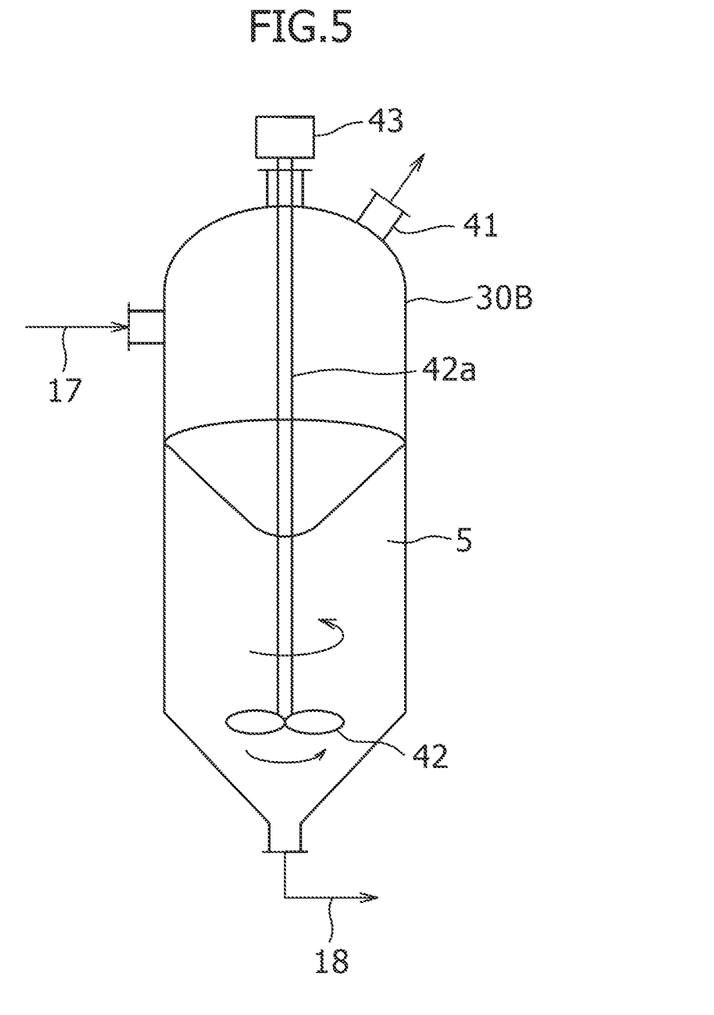
FIG. 5 is a side view schematically showing another example of a swirling flow separator shown in FIG. 1.

As shown in FIG. 5, a vane type swirling flow separator 30B is provided with a rotary vane 42 whose rotating shaft 42a extends vertically in the central portion of the separator, and a motor 43 for rotationally driving the rotary vane 42.

Also, this swirling flow separator 30B is provided with an oxygen discharge line 41, which discharges oxygen released from the rich absorbing solution, in the top portion thereof.

The regeneration tower 40 is provided with a carbon dioxide discharge line 26, which discharges carbon dioxide gas released from the rich absorbing solution, in the tower top portion thereof. This carbon dioxide discharge line 26 is provided with a condenser 27 for condensing water vapor in the carbon dioxide gas, and a separation drum 28 for separating water vapor from carbon dioxide gas. The separation drum 28 is provided with a condensed water circulating pump 29 for supplying condensed water to the tower upper portion of the regeneration tower 40.

Furthermore, the regeneration tower 40 is provided with a regeneration superheater 31 for superheating the lean absorbing solution taken out of the tower lower portion, a water vapor line 32 for supplying water vapor of a superheat source to the regeneration superheater 31, and a separator 33 for separating the condensed water produced by superheating and the water vapor from each other.

According to the above-described configuration, first, the combustion exhaust gas discharged from the boiler 10 is sent from the flue-gas duct 10a to the exhaust gas cooling tower 14 via the exhaust gas introduction line 11 by using the exhaust gas blower 16 to recover carbon dioxide in the gas. In the exhaust gas cooling tower 14, the combustion exhaust gas is cooled by the cooling water supplied through the cooling water circulation line 13, and thereafter the cooled combustion exhaust gas is sent to the carbon dioxide absorption tower 20 via the exhaust gas line 12.

In the carbon dioxide absorption tower 20, in the carbon dioxide recovery part 20A located in the tower middle portion, the combustion exhaust gas comes into counter-flow contact with the absorbing solution whose base is an amine-based solution to absorb carbon dioxide. Thereby, the carbon dioxide in the exhaust gas is absorbed into the absorbing solution through a chemical reaction, for example, $R-NH_2 + H_2O + CO_2 \rightarrow R-NH_3HCO_3$. As the amine-based solution, an alkanolamine such as monoethanolamine, diethanolamine, diisopropanolamine, methyldiethanolamine, or triethanolamine can be used.

The exhaust gas from which carbon dioxide has been removed is brought into gas-liquid contact with the condensed water supplied through the condensed water circulation line 19, and the absorbing solution accompanying the exhaust gas is recovered. The exhaust gas having been washed is released to the outside of the system through the exhaust gas release line 21 in the tower top portion. The rich absorbing solution having absorbed carbon dioxide in the carbon dioxide recovery part 20A flows down to the tower bottom portion of the carbon dioxide absorption tower 20.

Then, nitrogen gas is blown into the rich absorbing solution 5 staying in the tower bottom portion through the nozzles 34a of the bubbling gas supplier 34 as shown in FIG. 2. Thereby, dissolved oxygen in the rich absorbing solution 5 is sucked into the bubbles of nitrogen, and thereby the dissolved oxygen can be removed from the rich absorbing solution 5. As the bubbling gas, besides nitrogen gas, carbon dioxide gas, water vapor, or the like may also be used. By blowing the bubbling gas, oxygen existing as bubbles in the rich absorbing solution 5 can also be removed. In place of the bubbling, or simultaneously with the bubbling, the oscillator 35a of the ultrasonic wave generator 35 is oscillated. By applying ultrasonic oscillation to the rich absorbing solution 5 staying in the tower bottom portion, too, the dissolved oxygen in the rich absorbing solution 5 can be released. By the application of ultrasonic oscillation, the bubbles of oxygen can also be removed from the rich absorbing solution 5. Furthermore, by agitating the rich absorbing solution 5 by using the agitator 36, the bubbles of oxygen in the rich absorbing solution 5 can be removed. The rich absorbing solution from which the dissolved oxygen and the oxygen bubbles have been removed is sent to the swirling flow separator 30 through the rich absorbing solution line 17 by using a rich solvent pump 22.

In the case in which a press-in type separator is used as the swirling flow separator 30, as shown in FIGS. 3 and 4, in the swirling flow separator 30A, by causing the rich absorbing solution 5 pressurized by the rich solvent pump 22 to flow in the tangential direction of the cross-sectional circle of the swirling flow separator 30A from the supply port 37, the swirling flow of the rich absorbing solution 5 is produced. Bubbles are concentrated in the center of the swirling flow separator 30A by a centrifugal force generated by this swirling flow, whereby the bubbles of oxygen can be separated and removed from the rich absorbing solution. Into the swirling flow of the rich absorbing solution, bubbling gas can also be blown through the nozzles 38a of the bubbling gas supplier 38. Thereby, the oxygen existing as the bubbles in the rich absorbing solution 5 and the dissolved oxygen can be removed efficiently at the same time. The oxygen separated from the rich absorbing solution is discharged through the oxygen discharge line 39.

Although not shown in FIGS. 3 and 4, a device for heating the rich absorbing solution can be provided in the swirling flow separator 30. By heating the rich absorbing solution, the efficiency in removing oxygen by using the swirling flow can be improved. The heating temperature of the rich absorbing solution is preferably in the range of 50 to 70° C. By raising the temperature of the rich absorbing solution as described above, the dissolved oxygen can also be removed. As the device for heating the rich absorbing solution, heat exchange with the lean absorbing solution or the like can be used.

In the case in which a vane type separator is used as the swirling flow separator 30, as shown in FIG. 5, in the swirling flow separator 30B, a swirling flow of the rich absorbing solution 5 is produced by the rotation of the rotary vane 42. Thereby, the bubbles of oxygen can be separated and removed from the rich absorbing solution in the same way as described above. The oxygen separated from the rich absorbing solution is discharged through the oxygen discharge line 41.

The rich absorbing solution 5 from which the dissolved oxygen and the oxygen bubbles have been removed as described above is supplied from the bottom portion of the swirling flow separator 30 to the regeneration tower 40 via the rich absorbing solution line 18. The rich absorbing solution 5 is supplied to the regeneration tower 40 after being heated by the lean absorbing solution, which is the absorbing solution regenerated by the regeneration tower 40, in the rich and lean solvent heat exchanger 23 provided in the rich absorbing solution line 18.

From the rich absorbing solution introduced into the regeneration tower 40 from the upper portion thereof, most carbon dioxide is released through an endothermic reaction. The carbon dioxide absorbing solution from which most carbon dioxide has been released in the regeneration tower 40 flows down in the regeneration tower 40, and when the absorbing solution reaches the lower portion of the regeneration tower 40, almost all of the carbon dioxide is removed. The lean absorbing solution from which carbon dioxide has been removed is supplied again into the regeneration tower 40 after being superheated by the water vapor in the water vapor line 32 in the regeneration superheater 31 on the outside of the tower. The water vapor having been heat-exchanged in the regeneration superheater 31 is introduced into the separator 33, and is separated into the produced condensed water and water vapor. The water vapor is returned again to the water vapor line 32.

On the other hand, from the tower top portion of the regeneration tower 40, carbon dioxide gas accompanying water vapor released from the rich absorbing solution is sent to the condenser 27 via the carbon dioxide discharge line 26. In the condenser 27, the water vapor in the gas is condensed, and after the condensed water has been separated in the separation drum 28, carbon dioxide gas is released to the outside of the system and recovered separately. Since oxygen has been separated and removed sufficiently from the recovered carbon dioxide gas as described above, the oxygen removal is not accomplished separately, and the recovered carbon dioxide gas can be used as a raw material in the chemical industry or as a gas injected in an oil field for the enhanced oil recovery (EOR) process without being processed.

The condensed water having been separated in the separation drum 28 is supplied to the upper portion of the regeneration tower 40 by the condensed water circulating pump 29. The lean absorbing solution having been regenerated by releasing carbon dioxide is supplied from the tower bottom portion of the regeneration tower 40 to the carbon dioxide absorption tower 20 via the lean absorbing solution line 15 by the lean solvent pump 25. After the lean absorbing solution has been cooled by the rich absorbing solution in the rich and lean solvent heat exchanger 23 provided in the lean absorbing solution line 15, the lean absorbing solution is further cooled by the lean solvent cooler 24, and then is supplied to the carbon dioxide absorption tower 20.

Examples

After a rich absorbing solution having absorbed carbon dioxide by using an amine solution based absorbing solution from exhaust gas of a natural gas-fired boiler had been turned into a swirling flow by using the rotary vane, the processing in which oxygen in the rich absorbing solution was removed by the bubbling of nitrogen gas was performed. Thereafter, this rich absorbing solution was heated to release carbon dioxide in the absorbing solution, the carbon dioxide gas was recovered, and the concentration of oxygen in the recovered carbon dioxide gas was determined by simulation. The result is given in Table 1. In this example, the oxygen concentration in the boiler exhaust gas was 3%, the temperature of the rich absorbing solution in the oxygen removal processing was 50° C., and the carbon dioxide recovery amount with respect to the rich absorbing solution of 1000 kg (55.5 kg$^{-mol}$) was 2.06 kg$^{-mol}$ (90.7 kg).

TABLE 1

|  | Oxygen concentration in recovered carbon dioxide (ppm vol.) |
|---|---|
| Swirling flow + bubbling | <5 |
| Swirling flow + ultrasonic waves | <5 |
| Bubbling only | <10 |
| Ultrasonic waves only | <10 |
| Swirling flow only | 20 |
| No processing | 50 |

Table 1 additionally gives the case of the same conditions as described above except the processing using ultrasonic waves in place of bubbling, the cases of bubbling only, ultrasonic waves only, and swirling flow only, and the case in which no oxygen removal processing was performed.

Furthermore, Table 2 gives the result of the case of the same conditions as described above except the use of a gas turbine exhaust gas in place of the boiler exhaust gas. In this example, the oxygen concentration in the gas turbine exhaust gas was 13%.

TABLE 2

|  | Oxygen concentration in recovered carbon dioxide (ppm vol.) |
|---|---|
| Swirling flow + bubbling | <10 |
| Swirling flow + ultrasonic waves | <10 |
| Bubbling only | <15 |
| Ultrasonic waves only | <15 |
| Swirling flow only | 60 |
| No processing | 100 |

In both cases, in the processing of swirling flow only, oxygen bubbles in the rich absorbing solution were merely removed, and the reduction in oxygen concentration was insufficient in terms of the effective use of carbon dioxide gas. In contrast, by combining the processing using a swirling flow with the processing for removing dissolved oxygen by using bubbling or ultrasonic waves, the oxygen in the rich absorbing solution was able to be reduced significantly. Also, in the processing of bubbling only or the processing of ultrasonic waves only, too, an effect of removing both of oxygen bubbles and dissolved oxygen was observed.

What is claimed is:

1. A carbon dioxide recovery system comprising:
   a carbon dioxide absorbing device for absorbing carbon dioxide from combustion exhaust gas into an absorbing solution by bringing the combustion exhaust gas into contact with the absorbing solution which absorbs carbon dioxide forming a $CO_2$-rich absorbing solution;
   a dissolved oxygen removing device for removing dissolved oxygen from the $CO_2$-rich absorbing solution;
   a bubble removing device for removing bubbles containing oxygen in the $CO_2$-rich absorbing solution; and
   a regenerating device which regenerates the absorbing solution by releasing carbon dioxide from the absorbing solution from which oxygen has been removed by the dissolved oxygen removing device and the bubble removing device and obtains carbon dioxide gas;
   wherein the bubble removing device is at least one device of a device for blowing bubbling gas into the $CO_2$-rich absorbing solution or applying ultrasonic oscillation or a device for turning the $CO_2$-rich absorbing solution into a swirling flow or agitating the rich absorbing solution.

2. The system according to claim 1, wherein in the flow of the $CO_2$-rich absorbing solution, the bubble removing device is provided on the rear flow side of the dissolved oxygen removing device.

3. The system according to claim 1, wherein in the flow of the $CO_2$-rich absorbing solution, the dissolved oxygen removing device is provided on the rear flow side of the bubble removing device.

4. The system according to claim 1, wherein the bubble removing device and the dissolved oxygen removing device are provided so as to process the $CO_2$-rich absorbing solution at the same time.

5. The system according to claim 2, wherein the dissolved oxygen removing device is at least one device of a device for blowing bubbling gas into the $CO_2$-rich absorbing solution, a device for applying ultrasonic oscillation, and a device for heating the $CO_2$-rich absorbing solution.

6. The system according to claim 4, wherein the dissolved oxygen removing device and the bubble removing device are identical devices, and these identical devices are a device for blowing bubbling gas into the $CO_2$-rich absorbing solution or a device for applying ultrasonic oscillation.

\* \* \* \* \*